United States Patent [19]

Janssen

[11] 4,230,928
[45] Oct. 28, 1980

[54] METHOD AND MACHINE FOR REBUILDING TRACK ROLLER ASSEMBLIES

[75] Inventor: Harvey W. Janssen, Lafayette, Calif.

[73] Assignee: Wolff Manufacturing Company, Burlingame, Calif.

[21] Appl. No.: 970,112

[22] Filed: Dec. 18, 1978

Related U.S. Application Data

[63] Continuation of Ser. No. 783,790, Apr. 1, 1977, abandoned.

[51] Int. Cl.³ .............................................. B23K 09/04
[52] U.S. Cl. ................................. 219/76.11; 29/402.18; 165/40; 165/89; 165/90; 219/76.1; 228/46; 228/222
[58] Field of Search ......................... 219/76.1, 76.11; 29/401 P; 165/89, 90, 40; 228/46, 222

[56] References Cited

U.S. PATENT DOCUMENTS

| | | | |
|---|---|---|---|
| 3,139,510 | 6/1964 | Marion | 219/76.11 |
| 3,411,568 | 11/1968 | Lorang | 165/40 |
| 3,514,568 | 5/1970 | Frus | 219/76 |
| 3,596,041 | 7/1971 | Frus | 219/73 X |
| 3,611,541 | 1/1970 | Garrett | 219/76.11 X |
| 3,638,606 | 2/1972 | Pieper | 165/89 |
| 3,838,734 | 10/1974 | Kilmartin | 165/90 |
| 3,895,209 | 7/1975 | Moriki | 219/76 |
| 3,965,974 | 6/1976 | Sernetz | 165/89 |
| 4,103,138 | 7/1978 | Moriki | 219/76.11 |

OTHER PUBLICATIONS

Perry, J., Chemical Engineers Handbook, 3rd ed., 1950, McGraw-Hill, N.Y., N.Y., p. 1334.

Primary Examiner—Richard R. Kucia

[57] ABSTRACT

Machine for rebuilding by welding hard metal on track roller assemblies. The machine includes a system for recirculating coolant through the assembly during a welding operation and for controlling the temperature of the coolant. The machine further includes means whereby as one roller assembly is being rebuilt, the previously welded roller assembly is cooled by the circulation of coolant.

4 Claims, 6 Drawing Figures

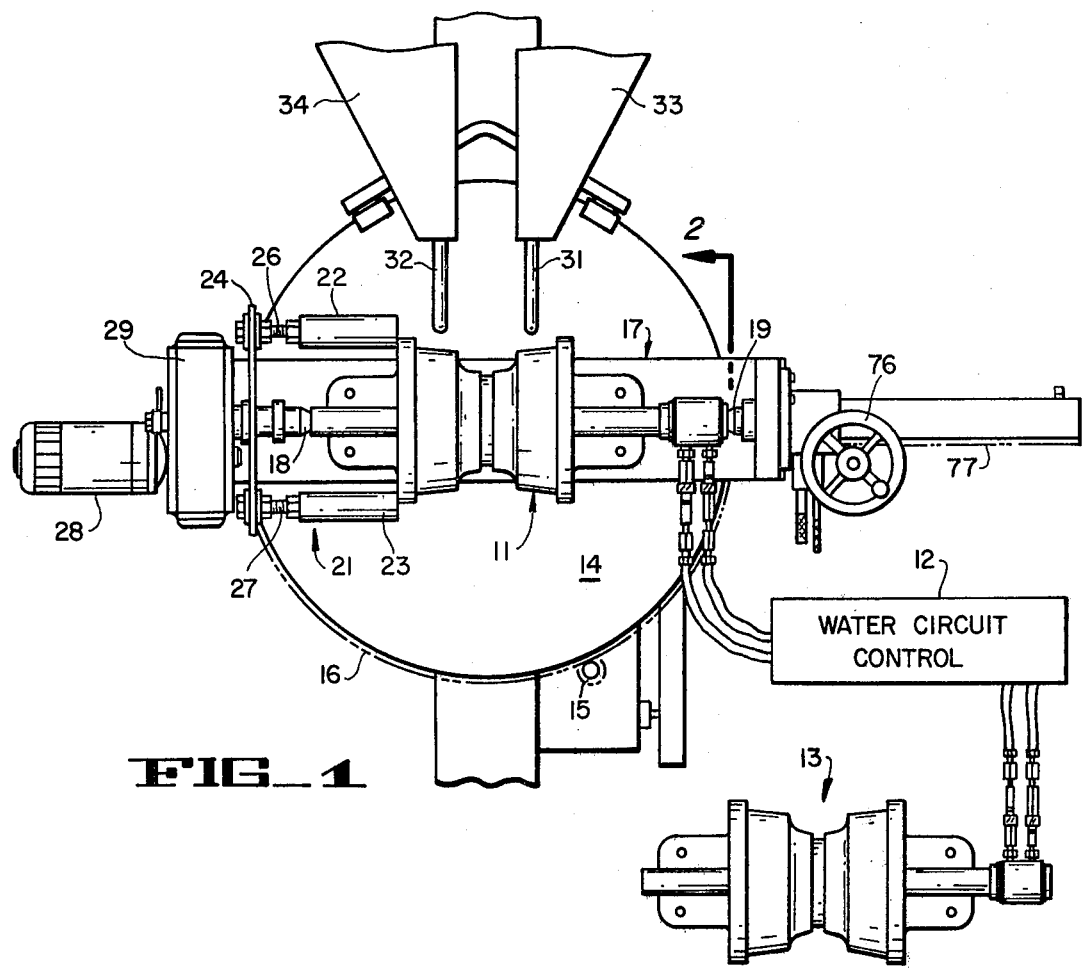
FIG_1
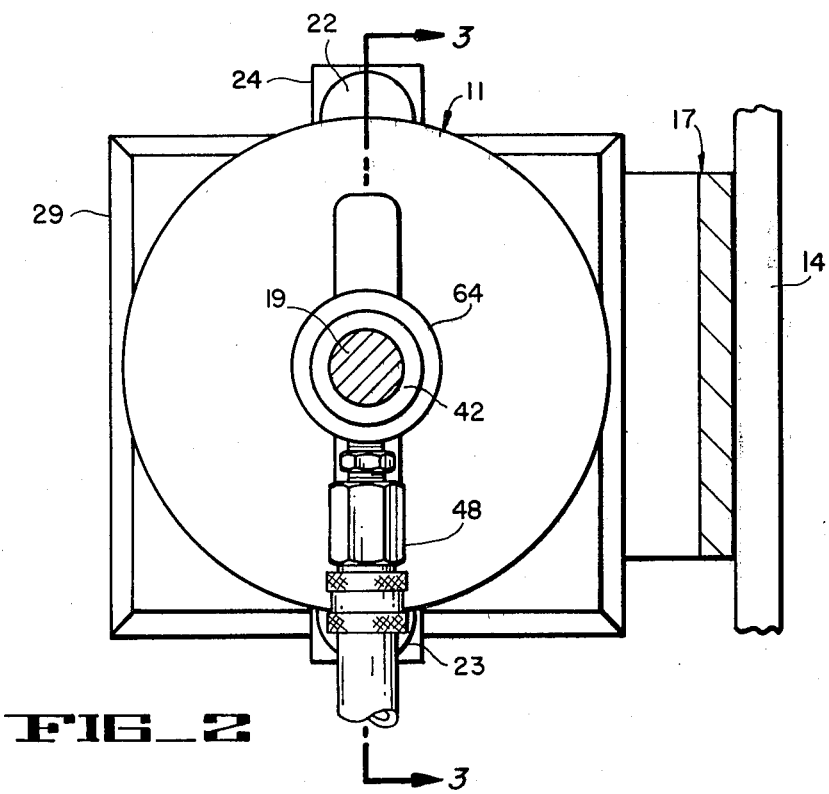
FIG_2

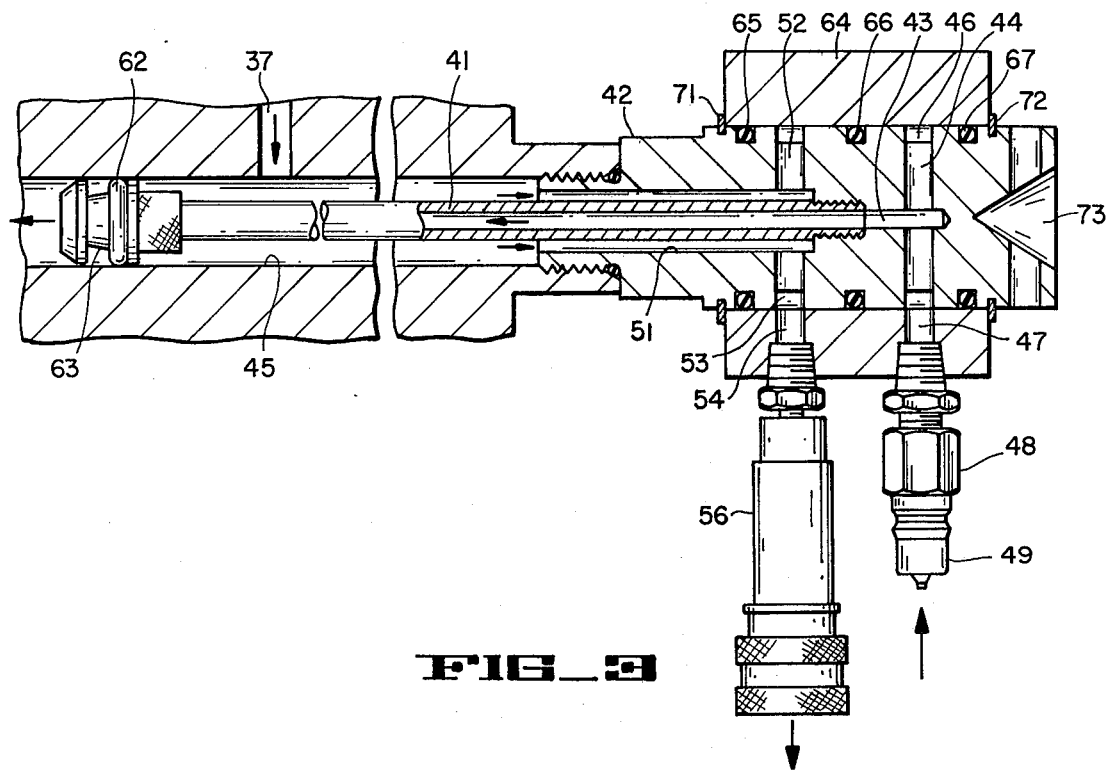
FIG_3
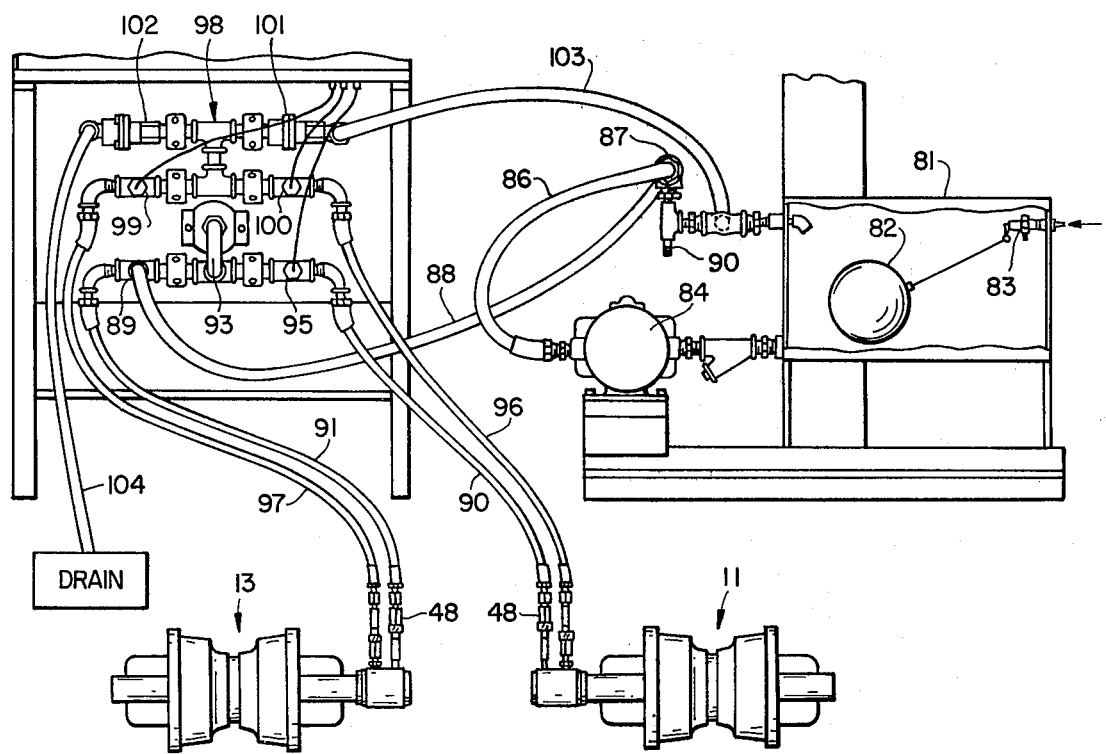
FIG_4

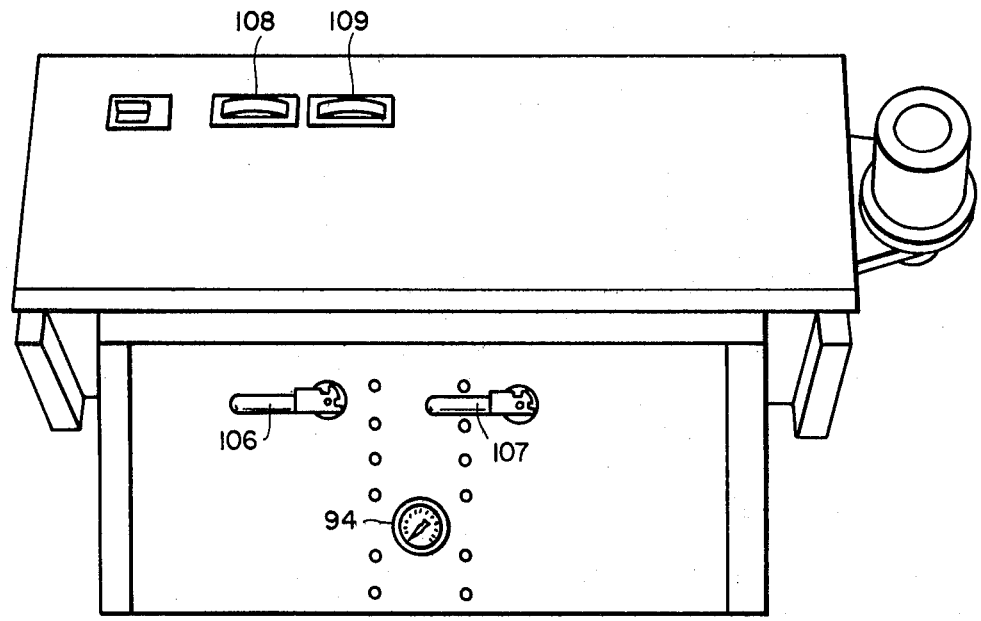
FIG_5
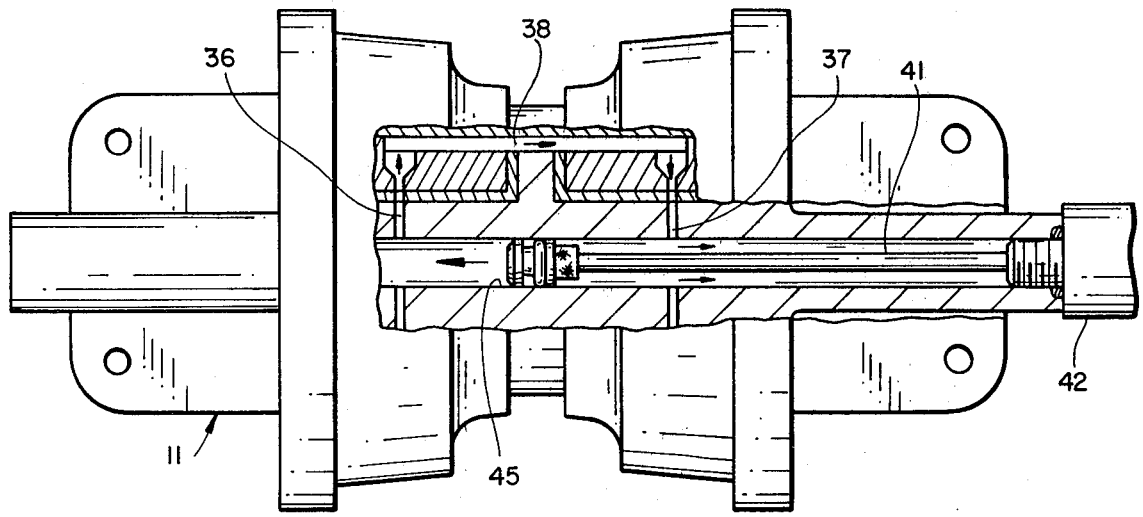
FIG_6

METHOD AND MACHINE FOR REBUILDING TRACK ROLLER ASSEMBLIES

This application is a continuation of application Ser. No. 783,790, filed Apr. 1, 1977, now abandoned.

BACKGROUND OF THE INVENTION

This invention relates generally to a machine for rebuilding worn tractor roller assemblies by depositing hard metal on the rim of the assembly while the rotor assembly is cooled by circulating coolant therethrough.

In track laying tractors, the upper span of the track is supported by roller assemblies while the tractor is supported on the lower ground engaging span of the track by roller assemblies. The roller assemblies typically include a rim which engages the track and is rotatably supported by an internal roller structure. Lubricant passages are formed in and between the interior structure and the rim. The passages are normally filled with lubricant and the structure sealed to provide a durable structure. The track roller and tracks are subjected to considerable wear because of the grinding action of the ground over which the tractor is operated. The exterior of the rim wears long before there is any wear of the internal structure of the roller.

It has become common practice to rebuild the exterior of the rim by applying a hard surface of metal by welding. Early machines for this purpose required that the roller be disassembled and the rim rebuilt by welding. In order to prevent overheating of the rim, intermittent welding operations were carried out, or the rim was submerged in water. Both of these processes are unsatisfactory because of the time consumed in the welding operaton and the time reqired to disassemble and reassemble the track roller assembly.

More recently, machines have been provided which permit rebuilding of the assembled rollers. Furthermore, these machines have included probes which are inserted into the roller circulated to circulate coolant through the lubricant passages to maintain the roller at suitable safe temperatures during the welding operations. This permits continuous welding of the roller without damage to the lubricant seals or warping and cracking of the metal. Typical machines of this type are described in U.S. Pat. Nos. 3,514,568; 3,596,041; and 3,895,209.

Such prior art systems have not provided for control of the coolant temperature whereby to maintain the roller at optimum temperature during the welding operation. Furthermore, upon completion of the welding operation, there is a waiting period for the roller assembly to cool down before the coolant supply can be disconnected. During this time the machine is idle. If, on the other hand, the coolant is disconnected prematurely, severe stresses are set up in the roller assembly which often lead to distortion or cracking of the metal parts of the assembly and damage to the roller seals.

OBJECTS AND SUMMARY OF THE INVENTION

It is a general object of the present invention to provide an improved coolant circulating system for a machine and method for rebuilding track rollers by welding.

It is another object of the present invention to provide a machine for rebuilding track rollers having a coolant system in which the coolant temperature and pressure can be controlled.

It is a further object of the present invention to provide a machine for rebuilding track rollers which permits rebuilding of one track roller while a previously built roller is being cooled.

It is still a further object of the present invention to provide a machine for rebuilding track rollers in which the temperature of the coolant entering and leaving the track roller is continuously monitored and means are provided for the operator to control the coolant temperature.

It is a still further object of the present invention to provide an improved probe assembly for introducing and circulating coolant through a track roller assembly during a rebuilding operation.

The foregoing and other objects are achieved by a machine for rebuilding track roller assemblies of the type having an external rim rotatably supported by an internal structure with lubricant passages formed in and between said internal structure and rim. The machine includes means for supporting and rotating at least the rim of the assembly; a coolant probe adapted to be inserted into a lubricant passage of said roller assembly; a coolant system for circulating coolant through the lubricant passage of said roller assembly, said system including a means for monitoring the temperature of the coolant entering and leaving said roller assembly and means for controlling the coolant so that the temperature of the coolant entering and leaving said roller assembly is within the predetermined limits. The machine also includes welding means for depositing metal of the surface of the rim as it is being rotated. Furthermore the coolant system includes two probes whereby one probe is connected to a roller which has been rebuilt to permit the roller to cool while a welding or rebuilding operation is being carried on on another roller.

BRIEF DESCRIPTION OF THE DRAWING

FIG. 1 is a front elevational view of a portion of a machine for rebuilding worn track roller assemblies in accordance with the present invention;

FIG. 2 is a sectional view taken generally along the line 2—2 of FIG. 1;

FIG. 3 is a sectional view taken generally along the line 3—3 of FIG. 2 and showing a partial view of a roller assembly;

FIG. 4 is a diagram showing the coolant system in accordance with the present invention;

FIG. 5 is a front elevational view of the control panel of the machine in accordance with the present invention;

FIG. 6 is a view showing a roller assembly with inserted probe.

DETAILED DESCRIPTION OF PREFERRED EMBODIMENT

Referring now to FIG. 1 a first roller assembly 11 is shown mounted on a machine for building track rollers in accordance with the present invention and connected to a coolant circuit such as the water circuit control 12 while a second roller assembly 13 is also connected to the coolant control circuit 12 and being cooled as would take place following a rebuilding operation. The welding apparatus shown includes a table 14 which can be rotated by means of the pinion gear 15 engaging rack 16 to appropriately position the roller adjacent the welding tips to be presently described. The table includes a roller mounting assembly 17 having spaced centering pins 18 and 19 mounted on opposite ends thereof. The roller assembly is supported between the pins 18 and 19 in a manner to be presently described. One end of the roller assembly is engaged by a driven means designated by 21 in the form of a spaced post 22 and 23 which are mounted on a plate 24 and which can be adjusted by rotating the same to thread onto the threaded shafts 26 and 27 respectively. The drive means is driven by a motor 28 through gear box 29 and which serves to drive the plate 24 and pin 18.

The welding equipment is schemmatically illustrated and includes wire guides 31 and 32 for guiding the welding wire to the adjacent portions of the rim. Nozzles 33 and 34 deliver pulverized or granular flux to the arc struck between the welding wire and the roller. A suitable power source not shown supplies electrical energy to the wire guide to sustain the arc.

Referring to FIGS. 3 and 6 a probe assembly is shown which is adapted to supply coolant to the lubricant passages 36, 37 and 38, FIG. 6. The probe includes a tube 41 which has one end threadably received and supported by an adapter 42. The tube communicates with axial adapter passage 43 which, in turn, communicates with radial passage 44. The end of the passage 44 communicates with the circumferential groove 46. Passage 47 associated with an input coupler 48 which includes nipple 49 for receiving the quick coupling of an associated tube is connected to the annular groove 46. An annular space 51 is formed between the tube 41 and the adapter 42 and serves to permit coolant to flow outwardly through the radial passages 52 to the circumferential groove 53 and then to the passage 54 associated with the output coupler 56.

Referring more particularly to FIG. 6, the fluid travels inwardly in the tube 41 through the passages 38 through the passage 36 back through the passages 37 and through the annular passage 51 of the probe. In accordance with one feature of the present invention, the tip of the probe includes an O-ring 62 which is mounted on a tapered surface 63 whereby when the probe is inserted, the O-ring is cammed outwardly to form an intimate seal with the central lubricant passage 45 of the roller assembly.

The probe provides means whereby the interior of the roller may rotate with the pins. In this regard the adapter 42 can rotate with respect to the coupler support 64. The grooves 46 and 53 are sealed from one another by means of O-rings 65, 66 and 67 disposed in grooves and which cooperate with the coupler support. Retaining rings 71 and 72 ride in grooves of the adapter 42 and serve to butt against the faces of the support 64.

The probe assembly shown permits rotation of the probe with the internal support structure while the inlet and outlet coolant hoses may remain stationary. The end of the adapter 42 is provided with a conical well 73 adapted to receive the support pin 19, FIG. 1. As the roller assemlby and probe are placed in the machine, the hand wheel 76 is rotated to cause a pinion gear, not shown, engages the rack 77 to cause the pin 19 to engage the conical surface and thereby support the roller assembly and probe between the two centering pins 18 and 19.

Referring now more particularly to FIGS. 4 and 5, a coolant system in accordance with a feature of the present invention is shown. The system includes a coolant reservoir 81, including a float 82 associated with a valve 83 which opens and closes to allow more coolant into the reservoir as coolant is discharged as will be presently described. The coolant is pumped through the probes and roller assemblies 11 and 13 by means of a pump 84 which provides fluid along the pressure tubing 86 to a fitting 87 which includes a pressure release valve 90 to maintain the pressure in the system. Tubing 88 is connected between the fitting 87 and fitting 89. Fluid flows from fitting 89 to the inlet tubings 90 and 91 connected to the input fittings 48 of the roller assemblies 11 and 13 respectively. The fitting 89 is connected by tube 93 to pressure gauge 94, FIG. 5. The temperature of the coolant is sensed by a probe 95 which is connected to digital display 108, FIG. 5. The output coolant from the roller assemblies 11 and 13 travels along the lines 96 and 97, respectively, and combines in a series of fittings forming a tee 98. Temperature probes 99 and 100 sense the temperature of the returning fluid and are connected to digital display 109. The coolant is controlled by control valves 101 and 102. Valve 101 controls the return of fluid along the conduit 103 to the reservoir and the other valve 102 controls draining of the fluid along the conduit 104. Thus, by manipulating the two valves, fluid may be discarded which would cause the fluid in the reservoir to be lower, the valve 83 to open and allow new cooler fluid to flow into the reservoir, thereby lowering the temperature of the fluid which enters the system. The control valves 101 and 102 include handles 106 and 107 respectively, FIG. 5, on the control panel where the operator can observe the meters temperature indicators 108 and 109 and control dumping or recirculation as desired to maintain a suitable coolant temperature.

More particularly, the water cooling system is designed to provide constant water temperature in order to permit proper cooling conditions for the assembled rollers during the rebuilding process. It has been found that the preferred coolant temperature, when the coolant is water, is for the incoming water to be between 70° and 75° F. while the exhausting temperature range should run between 95° and 110°. The proper temperature is maintained by the manipulation of two valve handles 106 and 107 on the temperature control panel. The recirculate valve controls the water flow from the reservoir to the roller and then directly back to the reservoir. This process will cause the water to become increasingly warmer as it picks up heat from the roller beam welded. The dump valve is then opened to allow the hot water to be cleared through the exhaust line while the fresh water is added to the reservoir.

The two sets of probes each with its own inlet and discharge hoses include quick connect couplings so that they may be quickly connected to the water circulating system. When one welding operation is completed the roller may be removed and laid down for cooling while the next roller is being cooled. When the roller is cooled, the hoses are detached and attached to a new roller placing it in readiness for the next welding operation. By alternating the two probe assemblies, it is possible to keep the rebuilder equipment operating almost continuously.

Thus, there has been provided a machine for rebuilding worn track roller assemblies which includes a coolant system including two probe. The systems permits control of the roller assembly temperature and continuous operation of the equipment. The probes include a rotary joint whereby the complete roller assembly including a rim and internal structure can be continuously rotated during the welding operation. The probe includes a novel tapered O-ring seal for providing a secure seal between the probe inlet tube and the outlet.

What is claimed is:

1. A machine for rebuilding by welding hard metal on track roller assemblies of the type having an external rim rotatably supported by an internal structure with lubricant passages formed in and between said internal structure and rim including:
    means for supporting said track roller assembly;
    means for rotating at least the rim of said track roller assembly;
    a first coolant probe adapted to be inserted into a lubricant passage of said roller assembly to circulate coolant through said passages to cool the roller assembly;
    welding means for depositing metal on the surface of said rim as it is rotated;
    a second coolant probe adapted to be inserted into a lubricant passage of a second track roller assembly to circulate coolant through said passages to cool said second roller assembly after said second roller assembly has been rebuilt, whereby while the roller assembly is supported in the machine and being welded said second roller assembly is being cooled to prevent damage; and
    a coolant system for circulating coolant through said lubricant passages; said system including a fluid reservoir, means for supplying coolant from said reservoir to each of said probes for circulation through said passages, means for monitoring the temperature of the coolant in said roller assemblies and means for controlling the reservoir coolant temperature so that the temperature of the coolant entering and leaving said roller assemblies has a temperature within a predetermined temperature range.

2. A machine for rebuilding track roller assemblies of the type having an external rim rotatably supported by an internal structure with lubricant passages formed in and between said internal structure and rim including:
    means for supporting said track roller assembly;
    means for rotating at least the rim of said track roller assembly;
    a coolant probe adapted to be inserted into a lubricant passage of said roller assembly, said probe including an inlet tube having a tapered tip portion and an O-ring mounted on said tapered portion whereby when the probe is inserted into the lubricant passage the O-ring moves along the tapered portion to wedge between the lubricant passage and the tip to form a seal;
    a coolant system for circulating coolant through said lubricant passage, said system including means for monitoring the temperature of the coolant entering said roller assembly and leaving said roller assembly and means for controlling the coolant so that the temperature of the coolant entering and leaving said roller assembly has a predetermined temperature; and
    welding means for depositing metal on the surface of said rim as it is rotated.

3. A machine for rebuilding track roller assemblies including internal lubricant passages one of which is axial including:
    a coolant probe assembly comprising an adapter for detachably securing said probe assembly to an associated track roller assembly and axial passage formed in said adapter adapted to cooperate with said axial lubricant passage when the adapter is secured to the track roller assembly, a tube having one end secured to said adapter extending outwardly therefrom and defining with said axial passage an annular adapter passage, said tube being disposed in the axial lubricant passage of an associated roller assembly to define therewith an annular passage cooperating with the annular adapter passage, means at the other end of said tube serving to form a seal between the other end of said tube and the axial lubricant passage which comprises a taper formed on the end portion of said tube and an O-ring mounted on said tapered portion whereby when the probe is inserted into the lubricant passage the O-ring moves along the tapered portion to wedge between the lubricant passage and the tube to form a seal;
    means for supplying coolant to said tube via said adapter; and
    means for removing coolant from said annular adapter passage whereby coolant flows via the tube passage through the lubricant passages and returns along the annular passages, said means for supplying and removing the coolant including a stationary coupling member carried by said adapter, radial passages formed in said adapter, and circumferential grooves formed between said adapter and said coupling member whereby coolant may be supplied from the stationary coupling member to the axial passages of the adapter;
    and a coolant system for circulating the coolant.

4. A machine for rebuilding track roller assemblies including an internal support structure and an external rim defining internal lubricant passages one of which is axial including:
    a coolant probe assembly comprising an adapter for detachably securing said probe assembly to the internal support of an associated track roller assembly,
    an axial passage formed in said adapter adapted to cooperate with said axial lubricant passage when the adapter is secured to the track roller assembly, a tube having one end secured to said adapter extending outwardly therefrom and defining with said axial passage an annular adapter passage, said tube being disposed in the axial lubricant passage of an associated roller assembly to define therewith an annular passage cooperating with the annular adapter passage, means at the other end of said tube serving to form a seal between the other end of said tube and the axial lubricant passage;
    means for supplying coolant to said tube via said adapter;
    means for removing coolant from said annular adapter passage whereby coolant flows via the tube passage through the lubricant passages and returns along the annular passages, said means for supplying and removing the coolant including a stationary coupling member carried by said adapter, radial passages formed in said adapter, and circumferential grooves formed between said adapter and said coupling member whereby coolant may be supplied from the stationary coupling member to the axial passages of the adapter as the complete roller assembly is rotated;
    and a coolant system for circulating the coolant.

* * * * *